United States Patent
Danby et al.

[19]

[11] Patent Number: 5,873,690
[45] Date of Patent: Feb. 23, 1999

[54] THREAD NUT EXPANSION FASTENER

[75] Inventors: Michael Richard Danby, Stony Creek; James Richard Mumby, Hamilton, both of Canada

[73] Assignee: Eaton Corporation, Cleveland, Ohio

[21] Appl. No.: 10,646

[22] Filed: Jan. 22, 1998

[51] Int. Cl.⁶ .................. F16B 13/06; F16B 37/04
[52] U.S. Cl. .................. 411/55; 411/61; 411/182; 411/508
[58] Field of Search .................. 411/173, 177, 411/182, 508, 509, 510, 520, 913, 55, 61, 60

[56] References Cited

U.S. PATENT DOCUMENTS

| | | |
|---|---|---|
| 2,430,555 | 11/1947 | Burke .................. 411/182 X |
| 2,476,799 | 9/1949 | Tinnerman . |
| 2,707,013 | 4/1955 | Flora et al. . |
| 4,595,325 | 6/1986 | Moran et al. .................. 411/173 |
| 4,610,588 | 9/1986 | Van Buren, Jr. et al. .................. 411/173 |

*Primary Examiner*—Neill Wilson
*Attorney, Agent, or Firm*—Daniel S. Kalka; Albert E. Chrow

[57] ABSTRACT

A barrel nut type fastener (100) is provided for securement within an opening (20) to a panel ("P") by a threaded member ("T") that when rotationally advanced through the barrel nut causes free-ends (14) and (14') of resilient legs (10) and (10') to move away from each other and respectively engage and urge resilient fingers (16) and (16') into contacting engagement with opposite sides of opening (20) with sufficient force to secure fastener (100) to panel, ("P").

3 Claims, 1 Drawing Sheet

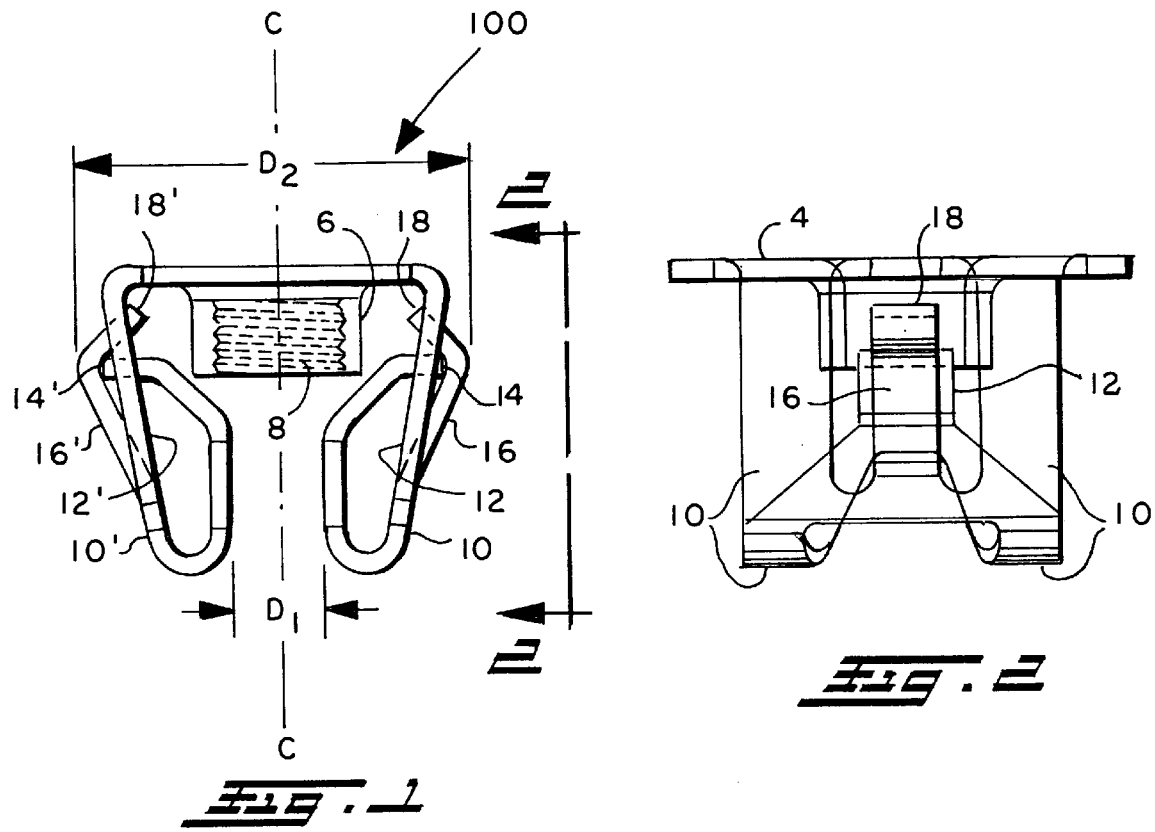
Fig. 1
Fig. 2
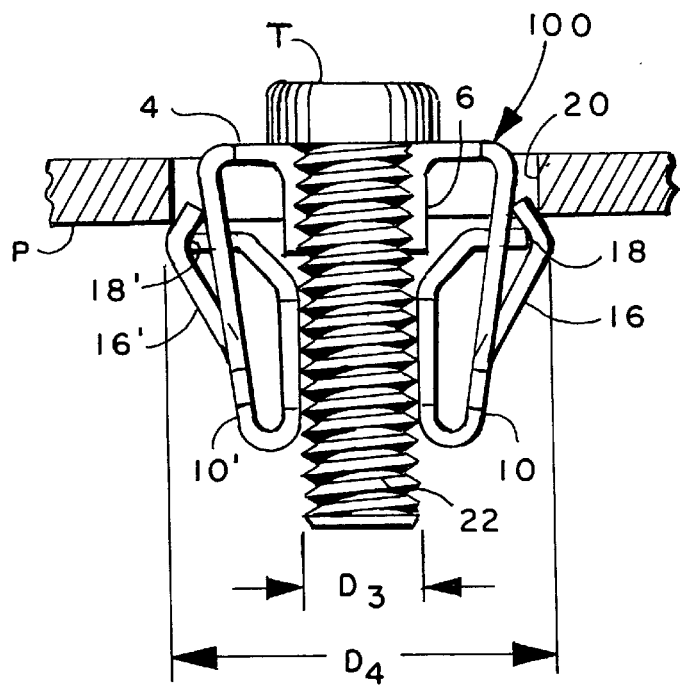
Fig. 3

THREAD NUT EXPANSION FASTENER

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

INTRODUCTION

The present invention relates generally to a fastener having a threaded nut portion adapted to threadingly secure an externally threaded member within a panel opening and more particularly to such fastener having a pair of resilient legs that are spread-apart by the threaded member and which in turn urge extremities of respective resilient fingers against opposite edges surrounding the panel opening in a manner effective to secure the fastener and the threaded member to the panel.

BACKGROUND OF THE INVENTION

Fasteners for securing threaded members within openings through panels have been known for many years of which examples are respectively disclosed in U.S. Pat. Nos. 2,426,799; 2,707,013 and 4,595,325 of which all are owned by the Assignee of the present invention and the disclosures of which are incorporated herein by reference and none of which operate in the manner of the fastener of the present invention.

For example, the fastening device of U.S. Pat. No. 2,426,799 is secured to a panel "A" by a squeezing force applied to its opposite faces by a threaded member "B" and in U.S. Pat. No. 2,707,013 a threaded member, such as a bolt or screw "1", is operative to spread a pair of legs "30" apart whose respective outer portions are formed into locking elements or fingers "35" that are urged directly against the surface of the panel surrounding the opening to secure the fastening device to the panel.

Although the fastener of U.S. Pat. No. 4,595,325 operates in a manner similar fastening device in U.S. Pat. No. 2,707,013 in that a threaded member "5" is operative to spread a pair of resilient legs "10" apart and cause tabs "18" to engage opposite edges of an opening through a panel "P$_2$" to secure the fastener within the opening to the panel, legs "10" are shaped entirely differently from those of the fastener of the present invention which features a pair of resilient fingers that respectively extend outwardly away from each other through respective openings through resilient legs for engagement with the panel edge surrounding the opening and further features legs that are in substantial parallel relationship with the threaded member for a prescribed distance of contacting engagement therewith.

Aside from the different manner by which the prior art fasteners (hereinbefore described) become secured to the panel by action of a threaded member, none feature an internally threaded nut portion operative to receive and threadingly engage external threads of a threaded member such as a bolt or screw rotationally advanced therethrough.

BRIEF SUMMARY OF THE INVENTION

Accordingly, it is an object of this invention to provide a fastener for securing a threaded member within an opening through a panel.

It is another object of this invention to provide a fastener having an internally threaded nut portion operative to secure an externally threaded member within an opening through a panel.

It is yet another object of this invention to provide a fastener having an internally threaded nut portion for threadingly engaging an externally threaded member that in turn is operative to indirectly urge a pair of resilient fingers against opposite sides of an edge surrounding the panel in a manner effective to secure both the fastener and the threaded member thereto.

BRIEF DESCRIPTION OF THE DRAWINGS

FIG. 1 is a central cross-section side view of an embodiment of the fastener of the invention referenced by numeral 100;

FIG. 2 is an edge view of fastener 100 taken along view line 2—2 in FIG. 1; and FIG. 3 is a central cross-section view of fastener 100 of FIG. 1 being secured to a panel "P" by a threaded member "T".

DESCRIPTION OF SOME PREFERRED EMBODIMENTS

In FIGS. 1 and 2, fastener 100 has a base portion 4 from one side of which extends a hollow open-ended barrel nut portion 6 having internal threads 8. A pair of resilient legs 10 and 10' respectively extend from opposite ends of base portion 4 past and beyond nut member 6 and thence curve inwardly towards each other and thence upwardly towards base portion 4 in substantially parallel spaced-apart relationship to each other and to central rotational axis "C" passing through nut portion 6 shown in FIG. 1.

The upwardly substantially parallel sections of legs 10 and 10' are spaced-apart from each other by the distance "$D_1$" and are in substantial transverse relationship with base portion 4 and then curve away from each other and thence extend through open windows in each respectively referenced by numerals 12 and 12' in FIG. 1.

Legs 10 and 10', after having passed through windows 12 and 12', end in respective free ends 14 and 14' that are in contacting relationship with resilient fingers 16 and 16' that respectively extend outwardly away from each other from the bottom edge of windows 12 and 12' and thence curve inwardly towards each other and thence preferably pass through the upper region of windows 12 and 12' and end in respective free-ends 18 and 18'.

As shown in FIG. 1, free-ends 14 and 14' of legs 10 and 10' contact fingers 16 and 16' at the location where they turn or dog leg inwardly towards each other as previously described.

As shown in FIG. 1, the distance between the outer edges of legs 10 and 10' at the location at which they respectively turn inwardly towards each other prior to receiving a threaded member such as threaded member "T" in FIG. 2 is referenced by "$D_2$" in FIG. 1.

As shown in FIG. 3, rotational advancement of threaded member "T" through nut portion 6 causes the legs 10 and 10' to spread apart from each other from an original distance "$D_1$" to a distance "$D_3$" which is the same as the outside diameter of threads 22 of threaded member "T".

In spreading apart from each other, free-ends 14 and 14' urge the outer edges of fingers 16 and 16' away from each other from an initial spaced-apart distance "$D_2$" referenced in FIG. 1 to a distance "$D_4$" shown in FIG. 4 causing the outer surface of the upper regions of fingers 16 and 16' to engage opposite sides or edges of opening 20 in panel "P" through which fastener 100 has been inserted with sufficient force to secure fastener 100 within opening 20 to panel "P".

The distance "$D_4$" can be expressed as being substantially equal to the distance calculated from the relationship "$D_2$"+ ("$D_3$"–"$D_1$").

Although the fastener of the invention may be made from any suitable resilient material or combination of materials, it is preferably of a one-piece construction made from a suitable spring steel.

Although the internal threads of nut portion 6 and the external threads 22 of threaded member "T" may be formed in any manner, one of the more preferred manners is when the internal threads of nut portion 6 are tapped machine threads and the external threads 22 of threaded member "T" are machined threads operative to threadingly engage the tapped internal threads of nut portion 6.

We claim:

1. A fastener for securing an externally threaded member within an opening through a panel, said threaded member external threads having a prescribed outside diameter, and said fastener comprising;

a base portion, a hollow internally threaded nut portion extending away from one side of the base portion, said nut portion having a central longitudinal axis in general transverse relationship to the base portion and having internal threads operative to threadingly engage the threaded member threads upon rotational advancement of the threaded member therethrough, a pair of resilient legs respectively extending from the opposite ends of the base portion past the nut portion and for a prescribed distance therebeyond and having corresponding windows extending respectively therethrough, said legs thence curving inwardly towards each other and thence upwardly towards the nut portion in general parallel spaced-apart relationship to each other for a prescribed distance with the nut portion central longitudinal axis in substantial intermediate parallel relationship therebetween with the distance between the legs less than the outside diameter of the threaded member by a prescribed amount, said legs thence curving away from each other and through the windows extending respectively therethrough and ending in respective free-ends facing away from each other, said legs having resilient fingers respectively extending from each leg angularly outwardly away from each other in a direction towards the base portion outwardly of the windows and thence respectively curving inwardly towards each other and ending in free-ends respectively located between the base portion and resilient leg free-ends, and said fastener operative such that rotational advancement of the threaded member through the nut portion enables the threaded member to urge the resilient legs away from each other causing the respective free-ends thereof to urge the resilient fingers away from each other and into contacting engagement with opposite edges of the panel opening in a manner effective to secure the fastener thereto.

2. The fastener of claim 1 wherein the threaded member is a machine screw and the nut portion threads are machine screw threads.

3. The fastener of claim 1 wherein the base portion and nut portion and resilient legs and resilient fingers are a one-piece sheet metal construction.

\* \* \* \* \*